Oct. 23, 1951  J. M. ANDREWS  2,572,582
SAFETY CONTROL FOR LIQUID-COOLED DEVICES
Filed July 21, 1950
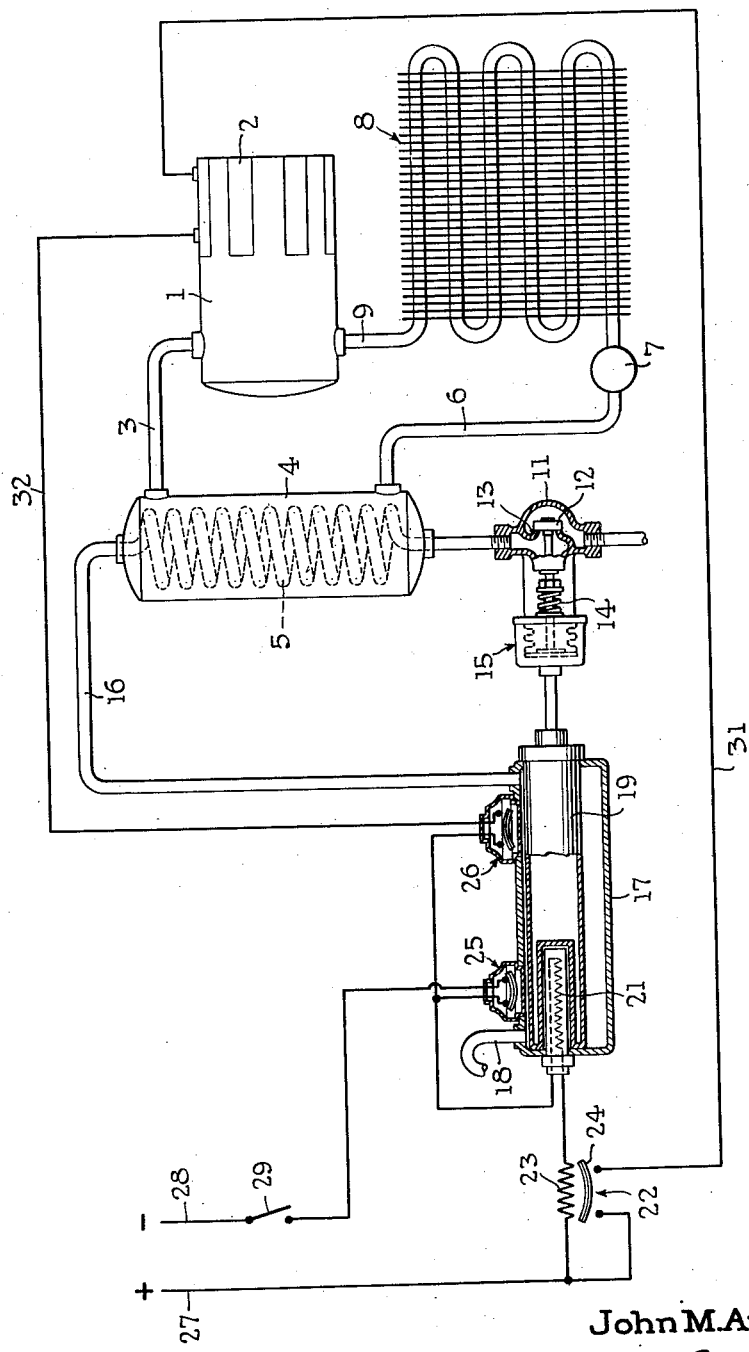
Inventor
John M. Andrews
By
Dodge and Inn
Attorneys Patented Oct. 23, 1951

2,572,582

UNITED STATES PATENT OFFICE 2,572,582

SAFETY CONTROL FOR LIQUID-COOLED DEVICES

John M. Andrews, York, Pa., assignor to York Corporation, York, Pa., a corporation of Delaware Application July 21, 1950, Serial No. 175,231

8 Claims. (Cl. 62—4)

This invention relates to safety controls for liquid-cooled devices, and will be described as embodied in a water-cooled refrigerating system in which the water is supplied from service mains. A refrigerating system is chosen as the basis for disclosure because such systems present the problem in all its important aspects, and because the art is presently highly developed and nevertheless unsatisfactory. There are other fields of use and these are not excluded.

The Underwriters require that any refrigerating system having a water-cooled condenser be equipped with automatic safeguards. The primary purpose is to shut down the plant if head pressure exceeds a chosen safe value.

The presently usual practice is to subject the stopping device to control in response to head pressure, and to establish the normal rate of water flow either by a pressure actuated valve subject to condenser pressure or by a thermostatic valve subject to the temperature of the water leaving the condenser. Devices which respond to pressure within the system are apt to develop leaks and thermostatic valves responsive to water temperature require either a water by-pass or a discharge gas connection to satisfy starting conditions. Thermostatic valves are particularly troublesome because they must open in response to rising temperature, and consequently are likely to be closed under starting conditions. Another objection to such valves is that they cease to function if the supply of water fails completely. The present invention avoids all these difficulties.

The problem which the industry has long sought unsuccessfully to solve is the provision of a safety mechanism for electrically driven systems which is wholly external to the refrigerative circuit, which will meet starting conditions, which will respond to both partial and complete cessation of water flow, which will not short-cycle upon water failure, which will not be adversely affected by moderate departure of voltage from the normal, and in which failure of any component of the control is on the side of safety.

Stated in its simplest terms the fundamental inventive principle is a scheme to sense the heat absorbing capacity of water leaving the condenser. To do so heat is supplied to the water at a fixed rate, and the resulting temperature is sensed. Cessation or retardation of flow will cause a temperature rise. A thermostatic switch responsive to such temperature rise is used to stop the unit.

In combination with this concept is that of using the same heat source to warm up the thermostatic water-regulating valve and so condition it for starting. In fact the warming action is continuous during operation of the plant so that the heat source and the cooling effect of water flow are balanced to control the water rate. This removes starting difficulties.

Other thermostatic switches are used to prevent short-cycling and to attain other useful ends which can be better stated after the system has been described, as it now will be by reference to the accompanying drawing.

In the drawing the single figure is a view in simplified diagram of a complete system.

In this view the thermostatic switches are shown as if they were interposed directly in the circuits which they control. This results in simplified circuits useful for explanation, and workable at least for small units. The possibility of using commercial relays piloted by the thermal switches, in order to switch heavier currents is recognized, but is not illustrated because such expedients are standard in the art, and their illustration would tend to obscure the invention in a mass of irrelevant detail.

In the drawing the compressor 1 and the electric motor 2 which drives it are enclosed in a hermetically sealed shell so that there are no stuffing boxes or other running seals. The compressor discharges through line 3 into the shell 4 of a condenser cooled by a helical water coil 5. Refrigerant liquefied in the condenser flows through line 6 to an expansion device 7 (which would commonly be the familiar capillary), and is expanded into the evaporator 8 connected with compressor 1 by suction line 9.

Water from any suitable supply main flows to coil 5 through valve body 11. A poppet valve 12 in body 11 is biased toward its seat 13 by spring 14 and may be forced open by pressure developed in motor 15 mounted on the valve body. After flowing through coil 5 the water passes by line 16 to control shell 17 from which it escapes through outlet 18 so arranged that it does not tend to drain shell 17.

Inserted through and sealed in an opening in the righthand end of shell 17 is a bulb 19 containing a thermally expansible fluid. The interior of bulb 19 is in communication with motor 15, as shown, so that rising temperature in shell 17 tends to force valve 12 from its seat 13.

The left end of bulb 19 is specially formed with a socket to receive a cartridge type electric resistance heater 21. Thus heater 21, when active, heats bulb 19 and both give up heat to water flowing through shell 17.

In describing the electrical connections, reference will be made to thermostatic switches, and to facilitate description the temperatures at which they open and close in this particular embodiment will be stated. These are representative of typical values. They are not critical but can be varied to modify the precise details of control.

Thermal switch 22 is a normally open delay switch having a heater coil 23 and a thermostatic (bi-metallic) contactor 24 which responds to coil 23 when the latter is hot and closes after a time interval of say 30 to 45 seconds. When coil 23 is deenergized the switch reopens in 10 to 15 seconds. Such switches are available in the open market.

Thermal switch 25 is subject to the temperature of water in shell 17 adjacent bulb 19 and heater 21. It is normally closed, opens at 110° F., and will reclose at 100° F.

Thermal switch 26 is subject to the temperature of water entering shell 17. It is normally open, closes at 90° which is slightly below the temperature normally maintained by bulb 19 and motor-valve 15—12. On falling temperature it reopens at 80°.

The two current mains appear at 27, 28. The switch 29 is a manually operable control switch.

The heater circuit is from main 27 through heater 23, heater 21, switch 25 and switch 29 to main 28. The motor circuit is from main 27 through contactor 24, line 31, motor 2, line 32, switch 26, switch 25 to main 28 through switch 29.

Operation

The drawing shows the system as it would appear shut down with the manual switch 29 open.

In starting up, the switch 29 is closed. This energizes the heaters 23 and 21, but the switch 22, controlled by the heater 23, has a delay period of 30 to 45 seconds before it closes and starts the motor 2. During this period the heater 21 warms up the bulb 19 and thus causes opening of the valve 12. As a consequence, water starts to flow through coil 5 of the condenser and through the shell 17. Switch 26 closes as soon as the temperature, here assumed to be 90°, is established in shell 17, and will not reopen unless temperature falls to 80°. The effect is to establish relatively stable cooling conditions before the compressor starts and begins to deliver heat to the condenser.

It will be observed that the heater 21 in the starter operation performs the useful function of opening the water valve which, under certain conditions of low ambient temperature, might be closed tight. After the compressor is in operation and operating conditions have leveled off, as they will under conditions of normal operation, the heater 21 will deliver a uniform increment of heat to the bulb 19 and to the water approaching the overflow 18. The thermostatic switch 25 is normally closed, but opens if temperature exceeds say 110°. This would indicate cessation or serious reduction of cooling water flow, and stops the compressor.

Since the bulb 19 and motor 15 are arranged to adjust the valve 12 progressively so that the condenser water will have a leaving temperature of approximately 95°, it will be obvious that the thermostatic switch 25 will shut down down the compressor if the condenser water rises 15° above the normal value.

Switch 26 exercises another control on the motor circuit. It keeps the motor and compressor from starting until the temperature in the shell 17 reaches the 90° value which is just below the temperature which the bulb 19 and motor 15 are designed to maintain. Thus, the switch 26 prevents starting of the compressor until the temperature conditions in the shell 17 are approximately stable. After it has closed it will not reopen unless the temperature falls to 80°. Hence, it will not interfere with the operation of the compressor during the starting or normal running period.

An important feature of the invention is that both of the heaters are in series with one another and with the two thermal switches. The parts are so arranged that the failure of any of these components will stop the compressor motor 2. As a consequence, any failure is on the side of safety. Quick reset (opening) of the switch 22 serves in conjunction with the thermal switch 25 to prevent short-cycling, if the system is shut down by failure of the cooling water.

The invention can be used in connection with the water cooling of devices other than the one illustrated. For example, while a motor driven compressor is the usual compressing means, there are circuits including other compressing means, and certain of these circuits are hermetically sealed and include water-cooled condensers. The invention is obviously capable of embodiment in such systems. The claims are drawn in inclusive terms designed to reach to the control system variously embodied.

I claim:

1. The combination of a refrigerative circuit including power-operated compressing means and a liquid-cooled condenser; connections for supplying and discharging cooling-liquid to and from said condenser; means responsive to the temperature of cooling-liquid adjacent said discharge connection, and serving to control the rate at which said liquid is supplied, to afford a normal operating condenser temperature; a heater arranged to supply a definite continuing increment of heat to the cooling-liquid approaching said discharge connection; and means responsive to excessive temperature of said liquid after the accession of said increment, to interrupt the supply of motive power to said compressing means.

2. The combination of a refrigerative circuit including power-operated compressing means and a liquid-cooled condenser; connections for supplying and discharging cooling-liquid to and from said condenser; a thermal device in heat-conducting relation with cooling-liquid adjacent said discharge connection; a valve actuated by said device, controlling the flow of liquid in heat-exchanging relation with said condenser and so actuated by said thermal device that rising liquid temperature causes opening motion of the valve; a heater associated with said thermal device and serving when active to deliver a uniform continuing increment of heat thereto and to cooling-liquid in contact therewith; and means responsive to excessive temperature of the cooling-liquid adjacent said thermal device to interrupt the supply of motive power to said compressing means.

3. The combination of the mechanism defined in claim 2 and time delay switch means arranged first to energize said heater and then after a time interval supply operating motive power to said compressing means.

4. The combination of the mechanism defined in claim 2 and time delay switch means arranged first to energize said heater and then after a time interval supply motive power to said compressing means, said time delay switch means comprising a second electric heater connected in series with the first named heater, which is also electric, and a thermostatic switch controlling the supply of motive power to said compressing means and arranged to close slowly when heated and open relatively quickly when cooled.

5. The combination of the mechanism defined in claim 2 and time delay switch means arranged first to energize said heater and then after a time interval supply motive power to said compressing means, and a normally open thermostatic switch also controlling the supply of motive power to said compressing means, subject to the temperature of the cooling-liquid approaching said heater, and arranged to close when the liquid is at or above the temperature normally established by said thermal device and the valve actuated thereby.

6. The combination of the mechanism defined in claim 2 and time delay switch means arranged first to energize said heater and then after a time interval supply motive power to said compressing means, and a normally open thermostatic switch also controlling the supply of motive power to said compressing means, subject to the temperature of the cooling-liquid approaching said heater, and arranged to close when the liquid is at or above the temperature normally established by said thermal device and the valve actuated thereby, said thermostatic switch being characterized by a wide temperature differential between its opening and closing such that after closure it remains closed until temperature falls substantially.

7. The combination of a refrigerative circuit including a compressor and a liquid-cooled condenser; connections for supplying and discharging cooling-liquid to and from said condenser; a thermal device in heat-conducting relation with cooling-liquid adjacent said discharge connection; a valve actuated by said thermal device, controlling the flow of cooling-liquid in heat-exchanging relation with said condenser and so actuated by said thermal device that rising liquid temperature causes opening motion of the valve; a heater associated with said thermal device and serving when active to deliver a uniform continuing increment of heat thereto and to cooling-liquid in contact therewith; a first thermostatic switch, subject to the temperature of said liquid adjacent said device, normally closed but adapted to open in response to excessive temperature; time delay switch means comprising a second electric heater connected in series with the first electric heater and a normally open second thermostatic switch arranged to close slowly when heated by said second heater; a motor connected to drive said compressor; and two related electric circuits in one of which the two heaters and the first thermostatic switch are connected in series, and in the other of which the second thermostatic switch, the motor and the first thermostatic switch are connected in series.

8. The combination of the structure defined in claim 7 and a third thermostatic switch which is biased to open and subject to the temperature of cooling-liquid approaching the first heater, said switch being arranged to close when said liquid is at or above the temperature maintained by said thermal device and valve, said third thermostatic switch being connected in series with the other thermostatic switches and the motor.

JOHN M. ANDREWS.

REFERENCES CITED

The following references are of record in the file of this patent:

UNITED STATES PATENTS

| Number | Name | Date |
| --- | --- | --- |
| 684,894 | Walcott | Oct. 22, 1901 |
| 806,478 | Marshall | Dec. 5, 1905 |
| 1,701,753 | Goosmann | Feb. 12, 1929 |
| 2,356,261 | McGrath | Aug. 22, 1944 |
| 2,388,800 | Pearce | Nov. 13, 1945 |